US007510584B2

(12) United States Patent
Cap

(10) Patent No.: US 7,510,584 B2
(45) Date of Patent: Mar. 31, 2009

(54) ACETYLATED WAX COMPOSITIONS AND ARTICLES CONTAINING THEM

(75) Inventor: Daniel S. Cap, 114 Jill La., Streamwood, IL (US) 60107

(73) Assignee: Daniel S. Cap, Maryville, TN (US)

( * ) Notice: Subject to any disclaimer, the term of this patent is extended or adjusted under 35 U.S.C. 154(b) by 644 days.

(21) Appl. No.: 10/964,081

(22) Filed: Oct. 13, 2004

(65) Prior Publication Data
US 2006/0075679 A1    Apr. 13, 2006

(51) Int. Cl.
*C11C 5/00*    (2006.01)
(52) U.S. Cl. .............................. 44/275; 44/389; 44/308
(58) Field of Classification Search .................. 44/275, 44/389, 308
See application file for complete search history.

(56) References Cited

U.S. PATENT DOCUMENTS

| | | |
|---|---|---|
| 1,935,946 A | 11/1933 | Egan |
| 1,954,659 A | 4/1934 | Will |
| 1,958,462 A | 5/1934 | Baumer |
| 3,630,697 A | 12/1971 | Dulling et al. |
| 3,645,705 A | 2/1972 | Miller et al. |
| 3,744,956 A | 7/1973 | Hess |
| 3,844,706 A | 10/1974 | Tsaras |
| 3,936,312 A * | 2/1976 | Stemmler et al. ............ 428/125 |
| 4,118,203 A | 10/1978 | Beardmore et al. |
| 4,134,718 A | 1/1979 | Kayfetz et al. |
| 4,293,345 A | 10/1981 | Zeilstra et al. |
| 4,314,915 A | 2/1982 | Wiegers et al. |
| 4,390,590 A | 6/1983 | Saunders et al. |
| 4,411,829 A | 10/1983 | Schulte-Elte et al. |
| 4,434,306 A | 2/1984 | Kobayashi et al. |
| 4,507,077 A | 3/1985 | Sapper |
| 4,567,548 A | 1/1986 | Schneeberger |
| 4,608,011 A | 8/1986 | Comstock |
| 4,614,625 A | 9/1986 | Wilson |
| 4,714,496 A | 12/1987 | Luken, Jr. et al. |
| 4,759,709 A | 7/1988 | Luken, Jr. et al. |
| 4,813,975 A | 3/1989 | Poulina et al. |
| 4,842,648 A | 6/1989 | Phadoemchit et al. |
| 4,855,098 A | 8/1989 | Taylor |
| 5,171,329 A | 12/1992 | Lin |
| 5,338,187 A | 8/1994 | Elharar |
| 5,578,089 A | 11/1996 | Elsamaloty |
| 5,753,015 A | 5/1998 | Sinwald et al. |
| 5,843,194 A | 12/1998 | Spaulding |
| 5,882,657 A * | 3/1999 | Miguel-Colombel et al. ............ 424/401 |
| 5,885,600 A | 3/1999 | Blum et al. |
| 6,007,286 A | 12/1999 | Toyota et al. |
| 6,019,804 A | 2/2000 | Requejo et al. |
| 6,022,402 A | 2/2000 | Stephenson et al. |
| 6,063,144 A | 5/2000 | Calzada et al. |
| 6,099,877 A | 8/2000 | Schuppan |
| 6,106,597 A | 8/2000 | Starks et al. |
| 6,132,742 A | 10/2000 | Le Bras et al. |
| 6,156,369 A | 12/2000 | Eger et al. |
| 6,214,918 B1 | 4/2001 | Johnson et al. |
| 6,276,925 B1 | 8/2001 | Varga |
| 6,277,310 B1 | 8/2001 | Sleeter |
| 6,284,007 B1 | 9/2001 | Tao |
| 6,497,735 B2 | 12/2002 | Tao |
| 6,503,285 B1 | 1/2003 | Murphy |
| 6,599,334 B1 | 7/2003 | Anderson |
| 6,645,261 B2 | 11/2003 | Murphy et al. |
| 6,758,869 B2 | 7/2004 | Roeske et al. |
| 6,773,469 B2 | 8/2004 | Murphy |
| 2002/0005007 A1 | 1/2002 | Roeske et al. |
| 2002/0157303 A1 | 10/2002 | Murphy et al. |
| 2003/0022121 A1 | 1/2003 | Biggs |
| 2003/0046860 A1 | 3/2003 | Tiffany et al. |
| 2003/0061760 A1 | 4/2003 | Tao et al. |
| 2003/0091949 A1 | 5/2003 | Pesu et al. |
| 2003/0110683 A1 | 6/2003 | Murphy |
| 2004/0031191 A1 | 2/2004 | D'Amico et al. |
| 2004/0088907 A1 | 5/2004 | Murphy |
| 2004/0088908 A1 | 5/2004 | Murphy |

FOREIGN PATENT DOCUMENTS

| | | |
|---|---|---|
| EP | 0 685 554 | 12/1995 |
| JP | 4-59897 | 2/1992 |
| JP | 6-9987 | 1/1994 |
| WO | WO 96/14373 | 5/1996 |
| WO | WO 02/092736 | 11/2002 |
| WO | WO 03/012016 | 2/2003 |

OTHER PUBLICATIONS

R.O. Feuge, et al., Modification of Vegetable Oils, XII, Plasticity of Some Aceta Derivatives of Monostearin, *The Journal of The American Oil Chemists' Society* (Jan. 1952 Issue, vol. XXIX, No. 1, pp. 11-14).
R.O. Feuge, et al., Modification of Vegetable Oils, XIII, Some Additional Properties of Acetostearin, Products, *The Journal of The American Oil Chemists' Society* (Jul. 1953 Issue, vol. XXX, No. 7, pp. 283-287).
Audrey T. Gros, et al., Consistency of Fats Plasticized with Acetoglycerides, *The Journal of The American Oil Chemists' Society*, (Sep. 1954 Issue, vol. XXXI, No. 9, pp. 377-383).
The Present Status of Acetoglycerides, by Alfin-Slater, et al., *The Journal of The American Oil Chemists' Society* (Mar. 1958 Issue, vol. XXXV, No. 3, pp. 122-127).
Bibliography On Acetoglycerides, Southern Utilization Research and Development Division (Feb. 1961).
The Candlelighter, *International Guild of Candle Artisans*, excerpts from various issues, date unknown.

(Continued)

*Primary Examiner*—Cephia D Toomer
(74) *Attorney, Agent, or Firm*—Pauley Petersen & Erickson

(57) ABSTRACT

A wax composition is provided having high melt temperature, flexibility, pliability and chemical stability. The wax composition includes an acetylated wax including an acetylated glyceride and, optionally, a plant-based wax. The wax composition is useful for candle wicks, dental floss, candle bodies and other articles where these properties are advantageous.

39 Claims, No Drawings

OTHER PUBLICATIONS

International Guild of Candle Artisans Yearbook and Buyers' Guide (Jan. 2000) (cover page and pp. 6081-6082).

Archer Daniels Midland Company technical data sheets (5 pages) and invoices to Nature's Gifts (6 pages), date unknown.

DPI's Acetoglycerides on Way, *Chemical And Engineering News* (two sheets of p. 1298), date unknown.

*Low shrinkage container wax mixtures using vegetable oils*, http://web.nstar.net/~whptx/temp/candveg.htm (9 pages), date unknown.

*Animal and Vegetable Fixed Oils, Fats, Butters, and Waxes, Their Preparation and Properties*, by C.R. Wright, (2d Ed., 1903) (pp. 624-669).

*The Industrial Chemistry of the Fats and Waxes*, by T.P. Hilditch et al., D. Van Nostrand Company (1927) (pp. 338-351).

*The Fats And Oils: A General View*, by Carl Alsberg et al., Fats And Oils Studies (Feb. 1928), Food Research Institute, (pp. 1-41).

*Industrial Waxes—Natural and Synthetic Waxes* (vol. I), by H. Bennett, Chemical Publishing Company, Inc. (1963) (pp. 131-155).

*Industrial Waxes—Compounded Waxes and Technology* (vol. II), by H. Bennett, Chemical Publishing Company, Inc. (1963) (three sheets including pp. 206-207).

*Bailey's Industrial Oil And Fat Products* (vol. 2, 4th Ed.), by Robert Allen, et al., (Copyright 1982, John Wiley & Sons, Inc.) (excerpts).

*The Merck Index* (9th Ed.), Merck & Co., Inc. (1976) (pp. 1251-1252).

*Candle Making*, by Terence McLaughlin, Coles Publishing Company Limited (1977), (3 sheets, including pp. 18-19).

*Candle Crafting From an Art to a Science*, by W. Nussle, A.S. Barnes and Co., Inc. (1971) (pp. 13-20 and 30-32).

*The soybean wax advantage*, Soyawax Soybean Wax—and Candleworks:—The Candle People (web page excerpt consisting of 5 pages), Victor Communications Company, LLC., (2001).

*The soybean wax advantage*, Soyawax Soybean Wax—and Candleworks:—The Candle People (web page excerpt, consisting of 5 pages, including company and products profile), Victor Communications Company, LLC. (2001).

Press Release, (two pages) (Mar. 4, 2003).

*Soy Candle History*, five-page excerpt from web site www.thesoydailyclub.com (Aug. 6, 2004).

Two-page article excerpt regarding history of Soyawax, undated.

\* cited by examiner

ACETYLATED WAX COMPOSITIONS AND ARTICLES CONTAINING THEM

FIELD OF THE INVENTION

This invention is directed to acetylated wax compositions having a combination of controlled melting points, reduced brittleness, improved flexibility and enhanced chemical stability. The invention is also directed to articles of manufacture incorporating the acetylated wax compositions.

BACKGROUND OF THE INVENTION

Plant-based wax compositions based on vegetable oils have become increasingly popular for use in the manufacture of candle wicks and candles, due in part to their relatively clean burning characteristics. Vegetable oils are often liquid at room temperature. In order to convert the vegetable oils to a wax-like consistency, they can be hydrogenated to various levels, and/or mixed with other ingredients such as fatty acids, monoglycerides, triglycerides and the like.

Complete hydrogenation of vegetable oils often leads to relatively high melting wax compositions which are brittle. The high melting points are beneficial because they allow the candle wicks and candles to remain stable during shipment and storage, even at relatively high temperatures experienced in southern climates. Yet the brittleness of the compositions can result in chipping and cracking of the compositions, before and during use of the candles.

Partial hydrogenation of vegetable oils yields wax compositions having greater flexibility and pliability, and less brittleness, which are desirable for use in candle wicks and candles. However, these wax compositions have lower melting points which may permit deformation or destabilization of the candles during shipment and storage at high temperature. Also, partially hydrogenated vegetable oils can oxidize during prolonged exposure to atmospheric air, especially at higher temperatures. Oxidation causes the wax compositions to be less uniform, and distorts their chemical make-up and burning characteristics.

There is a need or desire for vegetable oil-based wax compositions having a combination of controlled melting points, high flexibility and pliability, low brittleness, and chemical stability.

SUMMARY OF THE INVENTION

The present invention is directed to a wax composition including an acetylated vegetable wax. The acetylated vegetable wax includes an acetylated glyceride and, optionally, a plant-based wax. The acetylated glyceride includes at least an acetylated monoglyceride and may include an acetylated diglyceride. The acetylated glyceride may be partially or fully hydrogenated. The plant-based wax may be a partially or fully hydrogenated vegetable oil having an iodine value of about 0-80, or an unhydrogenated wax.

The acetylaed vegetable wax can be used alone or in combination with other ingredients to make the wax composition. The levels of hydrogenation in the acetylated glyceride and plant-based wax, the level of acetylation of the acetylated glyceride, the amounts and types of each, and the amounts and types of other ingredients are selected to provide a wax composition having suitable melting properties, flexibility, rigidity and chemical stability. The acetylated glyceride component increases the flexibility of the wax composition (i.e., decreases its brittleness and hardness) without undesirably affecting its melting point or chemical stability. This permits the use of other ingredients which are less flexible and have greater chemical stability, such as wax ingredients having higher levels of hydrogenation.

The present invention is also directed to articles of manufacture which incorporate the wax composition of the invention. These articles of manufacture include without limitation candle wicks, candles and dental floss, and coatings for paper and corrugated cardboard.

With the foregoing in mind, it is a feature and advantage of the invention to provide an improved wax composition and articles of manufacture as set forth herein.

DEFINITIONS

As used herein, "acetylated vegetable wax" refers to a blend that includes an acetylated glyceride and, optionally, a plant-based wax as described further below. The wax composition of the invention may include the acetylated vegetable wax alone or in combination with other ingredients. The ingredients of the acetylated vegetable wax (namely, the acetylated glyceride and the plant-based wax) may be added separately or together when making the wax composition.

As used herein, "acetylated glyceride" refers to glycerides derived from vegetable oils with varying levels of iodine values which have been acetylated as described below. As explained below, acetylated glycerides derived from vegetable oils typically include mixtures of acetylated monoglycerides and acetylated diglycerides, and may include unreacted triglycerides.

As used herein, the term "plant-based wax" refers to a plant-based substance which has a solid, wax-like consistency at ambient conditions (72° F., 50% relative humidity). The term includes vegetable oils which have been partially or fully hydrogenated or fractionated to generate a solid, wax-like consistency, and plant-based substances such as carnauba wax and candelilla wax which have a solid, wax-like consistency without requiring hydrogenation.

As used herein, "hydrogenated vegetable oil" encompasses partially and fully hydrogenated vegetable oils.

As used herein, "vegetable oil" includes any plant-based oil. Vegetable oils may be naturally occurring or processed, and may be solid or liquid at ambient conditions (72° F., 50% relative humidity). The term includes plant-based oils whose carbon-carbon double bonds are unsaturated, partially or fully saturated.

As used herein, "partially hydrogenated vegetable oil" includes any plant-based oil which has been partially hydrogenated. The term "partially hydrogenated vegetable oil" also includes mixtures of partially hydrogenated vegetable oil and fully hydrogenated vegetable oil. Such mixtures are by definition, partially hydrogenated with an intermediate level of hydrogenation. Similarly, the term "partially hydrogenated vegetable oil" includes mixtures of partially hydrogenated vegetable oil and vegetable oil which has not been hydrogenated, and mixtures of fully hydrogenated and unhydrogenated vegetable oil.

As used herein, "fully hydrogenated vegetable oil" includes any plant-based oil which has been fully hydrogenated. Fully hydrogenated vegetable oils typically have iodine values between zero and five.

As used herein, "iodine value" is the number of grams of iodine that an unsaturated compound or blend will absorb in a given time under arbitrary conditions. A low iodine value implies a high level of saturation, and vice versa. The iodine value can be determined by the WIJS method of the American Oil Chemists' Society (A.O.C.S. Cd 1-25).

DETAILED DESCRIPTION OF THE PRESENTLY PREFERRED EMBODIMENTS

The invention is directed to a wax composition including an acetylated vegetable wax, and articles incorporating the wax composition. The acetylated vegetable wax includes an actylated glyceride and, optionally, a plant-based wax.

The plant-based wax can be any plant-based substance which has a wax-like consistency at ambient conditions. Examples include plant-based substances such as carnauba wax, candelilla wax and rice bran wax which have a wax-like consistency without requiring hydrogenation. Other examples include partially and fully hydrogenated vegetable oils having an iodine value of about 0-80, suitably about 0-50, particularly about 0-25 and desirably about 0-10. The vegetable oil may be fully hydrogenated with an iodine value of about 0-5. A fully hydrogenated vegetable oil has the advantage of high melting point and chemical stability. Generally, the melting point of a vegetable oil increases as the level of hydrogenation increases and the iodine value decreases. The hydrogenation process adds hydrogen atoms to the carbon-carbon double bonds in unsaturated fatty acids.

In addition to higher melting points, hydrogenation leads to higher solid fat content and longer shelf life.

The plant-based wax can also be a fractionated vegetable oil. Fractionation removes the solid, wax-like components from the liquid components of vegetable oil by controlled crystallization and separation. Fractionation techniques involve the use of solvents or dry processing. The effect of hydrogenation or fractionation is to provide a vegetable oil with a sufficiently high degree of saturation to perform as a wax having a desired melting point and other properties.

The hydrogenated or fractionated vegetable oil can be derived from any plant-based oil. Examples include without limitation partially or fully hydrogenated cottonseed oil, sunflower oil, canola oil, peanut oil, soybean oil, safflower oil, corn oil, palm oil, olive oil, coconut oil, palm kernel oil, almond oil, jojoba oil, avocado oil, sesame oil, castor oil, and combinations thereof. The hydrogenated or fractionated vegetable oil may be derived from one or more vegetable oils having the same or different levels of hydrogenation. Castor oil is suitable because of its low cost. Fully hydrogenated castor oil is desirable because of its high melting point (about 84° C.) and chemical stability.

Vegetable oils derived from natural sources typically include one or more triglycerides as a major component, lesser amounts of diglycerides and monoglycerides, and very minor amounts of free fatty acids. A triglyceride is an ester compound of glycerol linked to three fatty acids, and has the following general formula:

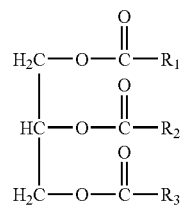

wherein $R_1$, $R_2$ and $R_3$ are fatty acid chains and may be the same or different.

A diglyceride is an ester compound of glycerol linked to two fatty acid chains. A monoglyceride is an ester composed of glycerol linked to one fatty acid chain. A free fatty acid is an unattached fatty acid in a vegetable oil, most commonly stearic acid and/or palmitic acid.

The hydrogenated vegetable oil can be partially or fully hydrogenated using known techniques for chemically adding hydrogen gas to a liquid vegetable oil in the presence of a catalyst. The process converts some or all of the unsaturated carbon-carbon double bonds in the vegetable oil molecules to single carbon-carbon bonds, thereby increasing the level of saturation. The degree of hydrogenation reflects the total number of double bonds which are converted. The hydrogenation may cause partial or total saturation of the double bonds in any of the vegetable oil components, including triglycerides, diglycerides, monoglycerides and free fatty acids. Partial hydrogenation may relocate some of the double bonds to new locations, e.g., from a cis isomeric configuration to a trans isomeric configuration. Sufficient hydrogenation typically causes the vegetable oil to assume a solid or semi-solid state at ambient temperature (e.g., 25° C.).

The acetylated glyceride can be derived from one or more glycerides of unhydrogenated vegetable oil, partially hydrogenated vegetable oil or fully hydrogenated vegetable oil. Suitably, the glycerides used for acetylation are partially or fully hydrogenated and have a collective iodine value of about 0-80, suitably about 0-50, particularly about 0-25, desirably about 0-10. The glycerides may be fully hydrogenated with an iodine value of about 0-5, for optimal chemical stability.

The acetylated glyceride may be formed by acetylation of any plant-based or animal-based glycerides. Examples of suitable plant-based glycerides include without limitation glycerides derived from unsaturated, partially or fully saturated cottonseed oil, sunflower oil, canola oil, peanut oil, soybean oil, safflower oil, corn oil, palm oil, olive oil, coconut oil, palm kernel oil, almond oil, jojoba oil, avocado oil, sesame oil, castor oil, and combinations thereof. Palm oil is suitable for acetylation because it converts readily to acetylated palm oil using the processes described below, leaving relatively less unreacted chemicals. Fully saturated palm oil is desirable because the resulting acetylated palm oil is chemically stable and does not oxidize significantly. Various levels of saturation may be naturally occurring or may be achieved by hydrogenation or fractionation as described above.

The acetylation reaction can be accomplished in two steps. First, the vegetable oil (saturated to an appropriate level) can be reacted with glycerol to form a mixture of monoglyceride and diglyceride molecules. The following reaction is exemplary:

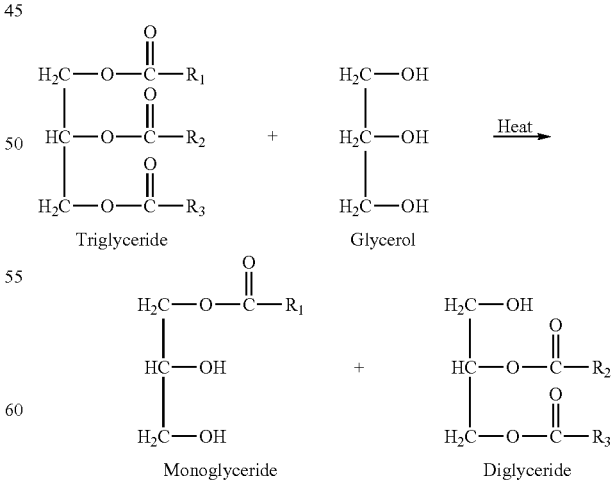

The above reaction may proceed in a mixing kettle, suitably a closed vessel, at a temperature high enough to melt the unsaturated, partially or fully saturated vegetable oil. Suitable temperatures may range from about 50-130° C., particularly about 80-120° C. A suitable catalyst may be employed.

The amount of monoglycerides and diglycerides obtained may be varied by increasing or decreasing the amount of glycerol in the reaction mixture relative to the unsaturated, partially or fully saturated vegetable oil. Equimolar quantities of triglyceride and glycerol favor the production of roughly equal amounts of monoglyceride and diglyceride. Higher levels of glycerol favor the production of more monoglyceride and less diglyceride. Lower levels of glycerol favor the production of more diglyceride. Much lower levels of glycerol (i.e., less than one mole of glycerol per two moles of triglyceride) favor the production of diglyceride and unreacted triglyceride.

Distilled monoglycerides, and mixtures of monoglycerides and diglycerides, are commercially available. One suitable mixture, containing roughly equal amounts of monoglyceride and diglyceride derived from soybean oil, is available from Bunge under the trade name ESTRIC.

Second, the monoglyceride and diglyceride molecules can be reacted with acetic anhydride to form acetylated monoglyceride and diglyceride molecules. The following reaction is exemplary:

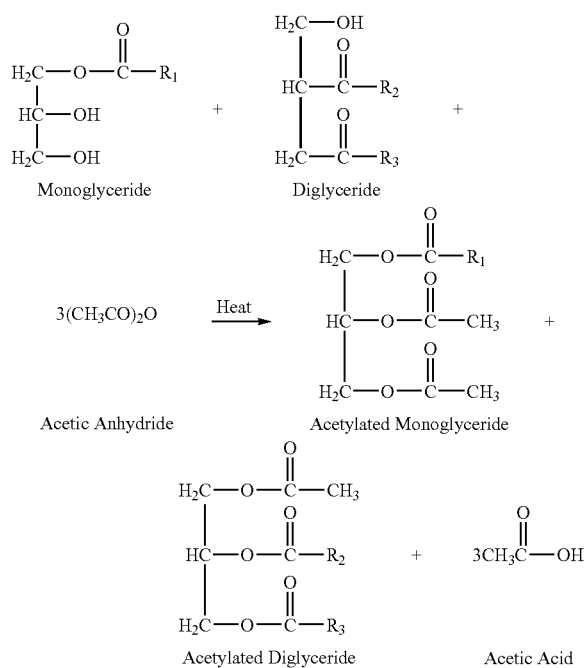

The second reaction step can proceed at a temperature high enough to soften and/or melt the glyceride components. For instance, the second reaction can proceed at a temperature of about 50-130° C., suitably about 80-120° C. The foregoing exemplary reaction achieves complete acetylation of monoglyceride and triglyceride molecules using a stoichiometric amount of acetic anhydride. Partial acetylation can be achieved using lower amounts of acetic anhydride. Following the second reaction step, the acetic acid and unreacted acetic anhydride can be washed away using water.

Other chemical processes can also be used to produce the acetylated glyceride. The invention is not limited to a particular reaction process, provided that the end product is an acetylated monoglyceride, or mixture of acetylated monoglyceride and acetylated diglyceride.

The degree of acetylation is the percentage of hydroxyl (—OH) linkages on the monoglyceride and diglyceride molecules that are converted to esters via acetylation. Each monoglyceride molecule has two hydroxyl groups available for conversion. Each diglyceride molecule has one hydroxyl group available for conversion. The degree of acetylation for the collective mixture of monoglyceride and diglyceride molecules influences the amount of flexibility that the acetylated glyceride contributes to the wax composition. Higher degrees of acetylation lead to higher flexibility and less rigidity. The degree of acetylation of the acetylated glyceride may range from about 10-100%, and is suitably about 30-85%, particularly about 45-75%.

The acetylated glyceride may contain at least about 40% by weight acetylated monoglyceride, suitably about 40-100% by weight acetylated monoglyceride and about 0-60% by weight acetylated diglyceride. In particular, the acetylated glyceride may contain about 45-95% by weight acetylated monoglyceride and about 5-55% by weight acetylated diglyceride.

Acetylated monoglycerides, and mixtures of acetylated monoglycerides and acetylated diglycerides, are available commercially. One source of acetylated monoglycerides, derived from fully hydrogenated palm oil, is available from Danisco Co. under the trade name GRINDSTED ACETAM 50-00PK. Another source, derived from fully hydrogenated soybean oil, is available from Quest Co. under the trade name MYVACET 5-07. Both products have a degree of acetylation of about 50%.

The acetylated vegetable wax may include about 0-95% by weight of the plant-based wax and about 5-100% by weight of the acetylated glyceride, suitably about 15-80% by weight of the plant-based wax and about 20-85% by weight of the acetylated glyceride, particularly about 30-65% by weight of the plant-based wax and about 35-70% by weight of the acetylated glyceride.

The wax composition of the invention may be substantially composed of the acetylated vegetable wax, or may contain significant amounts of other ingredients in addition to the acetylated vegetable wax. The wax composition may contain about 25-100% by weight of the acetylated vegetable wax, suitably about 50-100% by weight, particularly about 50-95% by weight. Other ingredients may constitute the balance of the wax composition.

Such other ingredients include without limitation beeswax, montan wax, paraffin wax and other conventional waxes. These waxes may be present at about 0-75% by weight of the wax composition, suitably about 0-50% by weight, particularly about 5-50% by weight.

Other ingredients also include additional free acids such as lauric acid, myristic acid, palmitic acid, stearic acid, arachidic acid, palmitoleic acid, oleic acid, gadoleic acid, linoleic acid, linolenic acid and combinations thereof. Free fatty acids may constitute about 0-75% by weight of the wax composition, suitably about 0-50% by weight, particularly about 5-50% by weight.

Other ingredients also include additional (e.g., non-acetylated) monoglycerides, diglycerides, propylene glycol monoesters, vegetable oil esters, sorbitan tristearate, and combinations thereof. These ingredients may constitute about 0-30% by weight of the wax composition, suitably about 1-20% by weight.

Conventional dyes, pigments and other coloring agents can be added to the wax composition at levels of about 0-3% by weight, suitably about 0.1-1.5% by weight. Conventional perfumes, fragrances, essences, other aromatic agents and scenting oils can be added to the wax composition at levels of about 0-12% by weight, suitably about 2-6% by weight.

The ingredients of the wax composition can be added individually or together to a melt blender and mixed at about 50-95° C., suitably about 55-70° C. until a uniform melt blend is obtained. Any conventional mixing equipment can be employed. The resulting wax composition is useful in a variety of articles.

The wax composition of the invention is particularly suitable for use as a wick wax for candle wicks. Candle wicks typically include a string material such as cotton string, paper/cotton blended string, fiberglass, nylon, hemp or any plant fiber. Candle wicks can also be made of non-consumable materials such as wire mesh. The wick wax is typically combined with the string material by soaking the string material in the molten wick wax, to make the candle wick. Higher soak temperatures facilitate incorporation of the wick wax into the string material. The wax composition of the invention, due to its chemical stability, can be maintained in the molten state at higher temperatures and/or longer times than conventional wax materials, with little or no oxidation, while keeping the necessary flexibility and rigidity for well-performing wicks.

The wax composition of the invention is particularly suitable for use in dental floss. Dental floss typically includes a nylon string or other high strength string material, having an embedded and coated wax for ease of sliding between the user's teeth. Dental floss should be highly flexible. The wax composition of the invention is useful for dental floss due in part to the flexibility contributed by the acetylated glyceride component.

The wax composition of the invention can also be used as a candlewax for container candles, stand-alone molded candles that are not in a container, and taper candles made by repeatedly dipping a wick into molten candlewax to form successive wax layers around the wick. Because the wax composition has a suitably high melting temperature, stand-alone candles made from it can be transported and stored in typical warm weather conditions without melting or deforming. Because of its chemical stability, the wax composition can be maintained in a molten state during manufacture of pillar candles without significantly oxidizing or otherwise degrading. Because of its pliability, the wax composition can burn desirably without cracking as sometimes happens with molded candles made using partially hydrogenated vegetable oils.

EXAMPLE

475 Kg of fully hydrogenated castor oil (m.p. 84° C.) was mixed with 525 Kg of acetylated glyceride (m.p. 49° C.) to produce a vegetable oil blend containing 47.5% by weight fully hydrogenated castor oil, 52.5% by weight acetylated glyceride, and having a melting point of 79° C. The fully hydrogenated castor oil was obtained from Campbell and Co. under the trade name HYDROGENATED CASTOR OIL. The acetylated glyceride was obtained from Danisco Co. under the trade name GRINDSTED ACETAM 50-00PK. The acetylated glyceride was derived from fully hydrogenated palm oil, distilled to about 90% by weight monoglyceride and about 10% by weight diglyceride, and had a degree of acetylation of about 50%.

The components were blended together for 30 minutes in an agitated kettle at a temperature of 94° C. The resulting wax composition had excellent flexibility, suitable for candle wicks, candles and dental floss, even though its melting point was only 5° C. lower than the fully hydrogenated castor oil. Due to the absence of unsaturated carbon-carbon double bonds, the wax composition possessed excellent chemical stability.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

I claim:

1. A wax composition, comprising an acetylated vegetable wax which includes:
   about 20-85% by weight of an acetylated glyceride; and
   about 15-80% by weight of a plant-based wax.

2. The wax composition of claim 1, wherein the plant-based wax comprises a vegetable oil.

3. The wax composition of claim 2, wherein the vegetable oil has an iodine value of about 0-80.

4. The wax composition of claim 2, wherein the vegetable oil has an iodine value of about 0-50.

5. The wax composition of claim 2, wherein the vegetable oil has an iodine value of about 0-25.

6. The wax composition of claim 2, wherein the vegetable oil has an iodine value of about 0-10.

7. The wax composition of claim 2, wherein the vegetable oil comprises a hydrogenated plant-based oil selected from the group consisting of cottonseed oil, sunflower oil, canola oil, peanut oil, soybean oil, safflower oil, corn oil, palm oil, olive oil, coconut oil, palm kernel oil, almond oil, jojoba oil, avocado oil, sesame oil, castor oil, and combinations thereof.

8. The wax composition of claim 2, wherein the vegetable oil comprises fully hydrogenated castor oil.

9. The wax composition of claim 1, wherein the plant-based wax is selected from the group consisting of carnauba wax, candelilla wax, rice bran wax, and combinations thereof.

10. The wax composition of claim 1, wherein the acetylated glyceride comprises about 40-100% by weight acetylated monoglyceride and about 0-60% by weight acetylated diglyceride.

11. The wax composition of claim 1, wherein the acetylated glyceride comprises about 45-95% by weight acetylated monoglyceride and about 5-55% by weight acetylated diglyceride.

12. The wax composition of claim 1, wherein the acetylated glyceride has a degree of acetylation of about 10-100%.

13. The wax composition of claim 1, wherein the acetylated glyceride has a degree of acetylation of about 30-85%.

14. The wax composition of claim 1, wherein the acetylated glyceride has a degree of acetylation of about 45-75%.

15. A wax composition, comprising an acetylated vegetable wax which includes:
   about 5-100% by weight of an acetylated glyceride, wherein the acetylated glyceride is derived from a vegetable oil having an iodine value of about 0-25; and
   about 0-95% by weight of a plant-based wax.

16. The wax composition of claim 15, wherein the acetylated glyceride is derived from a vegetable oil having an iodine value of about 0-10.

17. A candle wick comprising the wax composition of claim 1 and a string.

18. A candle comprising wax and the candle wick of claim 17.

19. A candle comprising wax and a wick, wherein the candlewax comprises the wax composition of claim 1.

20. A wax composition, comprising:
   about 25-100% by weight of an acetylated vegetable wax; and
   about 0-75% by weight of additional ingredients;

wherein the acetylated vegetable wax comprises about 20-85% by weight acetylated glyceride and about 15-80% by weight plant-based wax.

21. The wax composition of claim 20, wherein the acetylated vegetable wax comprises about 35-70% by weight of the acetylated glyceride and about 30-65% by weight of the plant-based wax.

22. The wax composition of claim 20, comprising about 50-95% by weight of the acetylated vegetable wax and about 5-50% by weight of the additional ingredients.

23. The wax composition of claim 22, wherein the additional ingredients comprise a wax selected from the group consisting of beeswax, montan wax, paraffin wax, and combinations thereof.

24. The wax composition of claim 22, wherein the additional ingredients comprise an ingredient selected from the group consisting of monoglycerides, diglycerides, propylene glycol monoesters, vegetable oil esters, sorbitan tristearate, and combinations thereof.

25. The wax composition of claim 22, wherein the additional ingredients comprise one or more free fatty acids.

26. The wax composition of claim 22, wherein the additional ingredients comprise an ingredient selected from coloring agents, scenting agents and combinations thereof.

27. A candle wick comprising a string and the wax composition of claim 20.

28. A candle comprising wax and the candle wick of claim 27.

29. A candle comprising candlewax and a wick, wherein the candlewax comprises the wax composition of claim 20.

30. A wax composition, comprising an acetylated wax which includes:
a first vegetable oil wax having an iodine value of about 0-25; and
an acetylated glyceride derived from a vegetable oil having an iodine value of about 0-25.

31. The wax composition of claim 30, wherein the first vegetable oil wax has an iodine value of about 0-10.

32. The wax composition of claim 30, wherein the acetylated glyceride is derived from a vegetable oil having an iodine value of about 0-10.

33. The wax composition of claim 30, wherein the first vegetable oil wax comprises castor oil.

34. The wax composition of claim 30, wherein the acetylated glyceride is derived from palm oil.

35. The wax composition of claim 30, wherein the acetylated glyceride comprises about 45-95% by weight acetylated monoglyceride and about 5-55% by weight acetylated diglyceride.

36. The wax composition of claim 30, wherein the acetylated glyceride has a degree of acetylation of about 45-75%.

37. A candle wick comprising a string and the wax composition of claim 30.

38. A candle comprising wax and the candle wick of claim 37.

39. A candle comprising candlewax and a wick, wherein the candlewax comprises the wax composition of claim 30.

* * * * *